UNITED STATES PATENT OFFICE.

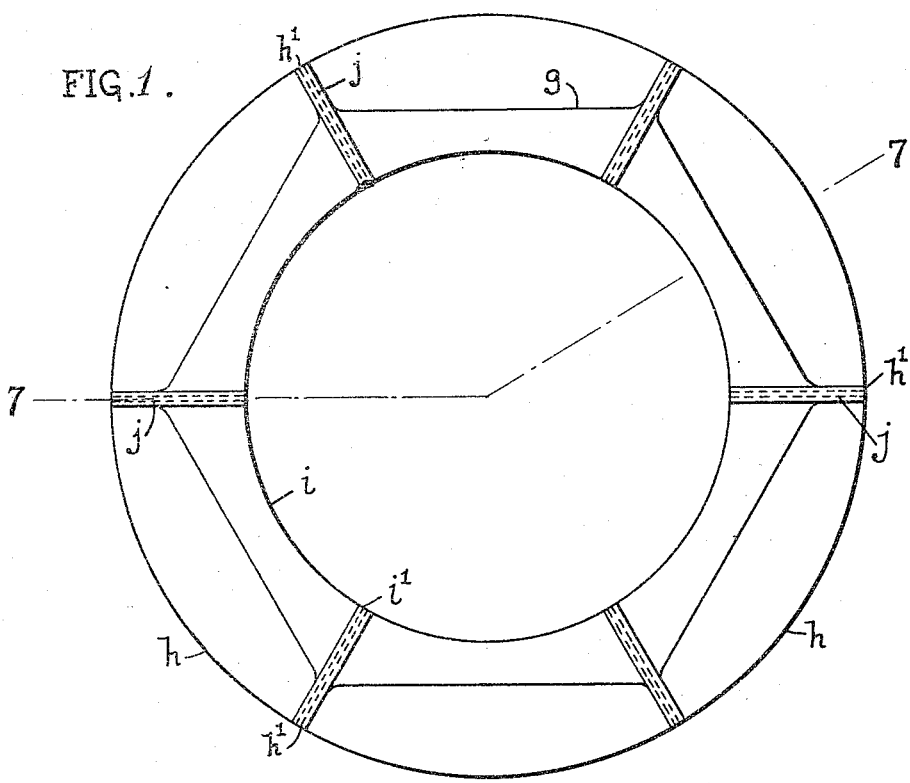
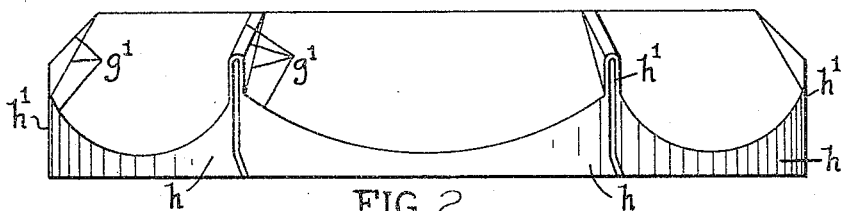
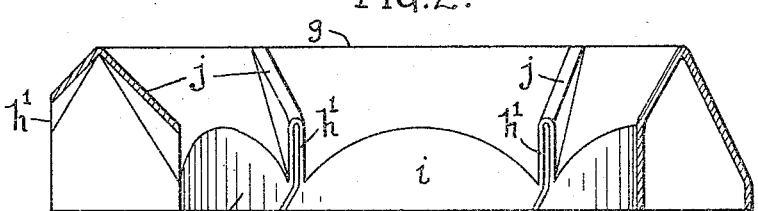

ROBERT DANIEL BRADFORD, OF LONDON, ENGLAND.

COMBINATION PACKING AND VALVE.

1,303,763. Specification of Letters Patent. Patented May 13, 1919.

Application filed December 30, 1914. Serial No. 879,796.

*To all whom it may concern:*

Be it known that I, ROBERT DANIEL BRADFORD, a subject of the King of Great Britain and Ireland, residing at 43 Lissenden Mansions, Highgate Road, London, England, have invented a new or Improved Combination Packing and Valve, of which the following is a specification.

The invention relates to an inclined packing made of flexible hard material which has a continuous contact surface and is expansible, for pumps, pistons, stuffing-boxes, glands or other members, and that may be used as a valve, in which a fluid tight joint is required to be made between two parts that are relatively movable axially, and the invention has for its object the provision of a combined packing and valve of this kind in which the greater part of the joint surface making contact with the wall to be packed is of large superficial area and consequently of long wearing durability.

According to this invention a combination packing and valve consists of a sheet of hard material bent to a form having a continuous expansible and contractible peripheral surface adapted to contact with a wall to be packed and having corrugations increasing in depth from the contact surface to an inexpansible part of the bent sheet that can be held fast relatively to the wall to be packed; the contact surface being in part at the edges of inclined approximately radial folds of the bent sheet and in part portions of a side of the said bent sheet.

When concentric and parallel surfaces require to be packed, as in the case of a piston rod and stuffing box, for example, the packing is annular and formed of a piece of hard material (glass, tempered steel, chilled cast iron, or other suitable material) bent so that it converges from an intermediate part toward the center on its inner side and so that one of its undulating edges makes contact with the rod or the like, while it diverges from the said intermediate part on its outer side so that its other undulating edge makes contact with the stuffing box wall or the like.

Flexible sheet packings according to this invention are well suited for use as valves and since they press on the seating surfaces or walls during that stroke only in which pressure is exerted to force them toward the seatings or walls they are more economical and durable in use than ordinary packings. Moreover, they are adaptable to surfaces or walls of oval, square or polygonal, as well as to surfaces of cylindrical form.

In the accompanying drawings Figures 1, 2 and 3 show in plan, elevation and section on the line 3—3 Fig. 1, respectively, a form of packing that may also be used as a valve, constructed in accordance with this invention.

The packing illustrated by the drawings, is made from a plate, bent as shown in Fig. 1, where $g$, $g^1$ indicate lines along which the plate, preferably of metal is bent. The parts of the plate which make contact with the inner wall to be packed, for example the inner wall of a stuffing box, are indicated by $h$ and that part adapted for contact with the outer surface, for example of a piston rod, is indicated by $i$.

When bent along the lines $g$, $q^1$ according to this invention, the packing will be of annular shape as shown in Fig. 1, having corrugations with radial folds $j$ which, as will be obvious from Figs. 2 and 3, allow a circumferential extension or contraction due to the slight relative lateral movement of the contact surfaces $h^1$ and $i^1$ and which movement is correlative to the pressure of a fluid acting from below or above respectively. In the former case the said fluid, in tending to expand the packing, presses the surfaces $h$, $h^1$ and $i$, $i^1$ into closer contact with the inner and outer walls, while in the latter case the pressure tends to collapse the packing and to remove the said surfaces $h$, $h^1$ and $i$, $i^1$ from the walls and to pass the fluid between. Thus in this form also, the packing is available for use as a valve for fluid proceeding in one direction and as a tight joint to fluid tending to proceed in the other direction.

After the packing is bent to the required shape, shown in the drawings, it is carefully ground to gage at the surfaces $h$, $h^1$, $i$ and $i^1$ to fit the cylinder, barrel, rod or plunger with which it has to work.

I use two rings such as just described but back to back for double action; that is to say, when passage of fluid is to be prevented in both directions then the line $g$ of one ring is placed in contact with the like line of the other ring. Or I may use separately either an inner side or edge or an outer side or edge of such a ring, that is to say that part of the ring lying within, or that part lying without the line $g$, together with a small part to form a seat lying respectively without or within the said line $g$, as circumstances may require for any or all of the several functions hitherto fulfilled by U, "hat", or "cup" leathers; by gland and piston jointing and by suction, pressure or non-return valves. Where convenient or desirable a device according to my invention may serve in the same construction the triple purpose of packing, valve and piston or bucket.

I have indicated only one process of manufacture so far, but I may construct packings according to my invention from molten material or I may carve them from the solid, and thus produced they may present an appearance entirely different from those above described, but in every case I obtain sufficient flexibility and elasticity for the purpose at hand by making the continuous contact surface and the material adjoining of sufficient length, to allow extension and contraction, by undulating the contour to obtain corrugations of a depth increasing from the said contact surface toward the inexpansible part of the bent sheet.

Claims:—

1. A combination packing and valve consisting of a sheet of hard material bent to a form having a continuous expansible and contractible peripheral surface parallel to the axis of said packing and valve and adapted to contact with a wall to be packed and having corrugations increasing in depth from the contact surface to an inexpansible part of the bent sheet adapted to be held fast relatively to said wall to be packed and the said contact surface being in part at the edges of inclined approximately radial folds of the said bent sheet and in part portions of a side of said bent sheet, substantially as described.

2. A combination packing and valve consisting of a sheet of hard material bent to an annular form having continuous expansible and contractible inner and outer surfaces each adapted to contact with a wall to be packed and having corrugations increasing in depth from the contact surfaces to an inexpansible part of the bent sheet adapted to be held fast relatively to the walls to be packed, the inner and outer contact surfaces being in part at the edges of inclined approximately radial folds of the said bent sheet and in part portions of a side of said bent sheet, substantially as described.

In testimony whereof I affix my signature in presence of two witnesses.

ROBERT DANIEL BRADFORD.

Witnesses:
 W. WILSON HORN,
 O. J. WORTH.

Copies of this patent may be obtained for five cents each, by addressing the "Commissioner of Patents, Washington, D. C."